United States Patent [19]
Kain et al.

[11] Patent Number: 5,894,323
[45] Date of Patent: Apr. 13, 1999

[54] AIRBORNE IMAGING SYSTEM USING GLOBAL POSITIONING SYSTEM (GPS) AND INERTIAL MEASUREMENT UNIT (IMU) DATA

[75] Inventors: James E. Kain, Andover, Mass.; Charles Yates, Fort Walton Beach, Fla.

[73] Assignee: TASC, Inc., Reading, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/621,107

[22] Filed: Mar. 22, 1996

[51] Int. Cl.⁶ .......................................... H04N 7/00
[52] U.S. Cl. .......................... 348/116; 348/117; 348/144
[58] Field of Search .......................... 348/61, 113, 116, 348/117, 118, 119, 120, 143, 144, 148, 159; H04N 7/00

[56] References Cited

U.S. PATENT DOCUMENTS

| | | | |
|---|---|---|---|
| 3,191,170 | 6/1965 | Lustig et al. | 343/5 |
| 4,589,610 | 5/1986 | Schmidt | 244/3.19 |
| 4,764,781 | 8/1988 | Leib et al. | 354/65 |
| 4,814,711 | 3/1989 | Olsen et al. | 324/331 |
| 5,166,789 | 11/1992 | Myrick | 358/109 |
| 5,247,356 | 9/1993 | Ciampa | 358/109 |
| 5,251,037 | 10/1993 | Busenberg | 358/213.28 |
| 5,267,042 | 11/1993 | Tsuchiya et al. | 358/209 |
| 5,270,756 | 12/1993 | Busenberg | 358/109 |
| 5,438,404 | 8/1995 | Hamilton et al. | 356/152.2 |
| 5,467,271 | 11/1995 | Abel et al. | 364/420 |
| 5,477,459 | 12/1995 | Clegg et al. | 364/460 |
| 5,490,075 | 2/1996 | Howard et al. | 364/459 |
| 5,503,350 | 4/1996 | Foote | 244/13 |
| 5,519,620 | 5/1996 | Talbot et al. | 364/449 |
| 5,557,397 | 9/1996 | Hyde et al. | 356/5.01 |

FOREIGN PATENT DOCUMENTS

| | | |
|---|---|---|
| 0 383 114 | 8/1990 | European Pat. Off. . |
| 0 598 454 | 5/1994 | European Pat. Off. . |
| WO95 16895 | 6/1995 | WIPO . |

*Primary Examiner*—Tommy P. Chin
*Assistant Examiner*—Y. Lee
*Attorney, Agent, or Firm*—Wolf, Greenfield & Sacks, P.c.

[57] ABSTRACT

A remote data collection system, which may be used in a vehicle such as an aircraft or a ground vehicle, includes a directional sensor, such as one or more cameras, for sensing a characteristic of interest and providing sensor data. The system further includes a global positioning system (GPS) receiver for providing GPS data representative of the position of the sensor, an inertial measurement unit (IMU) for providing IMU data representative of the attitude of the sensor, a processing unit and a storage unit. The processing unit determines geographic data referenced to the sensor data in response to the GPS data and the IMU data. The processing unit may utilize an error model to determine IMU errors which may be used in determining the geographic data with high accuracy. The sensor data and the geographic data are stored in the data storage unit for subsequent use. The system may include a stabilized platform on which the sensor and the IMU are mounted. The stabilized platform is rotated about at least one axis of rotation to control the sensing direction of the sensor as the vehicle moves.

17 Claims, 8 Drawing Sheets

AIRBORNE IMAGING SYSTEM USING GLOBAL POSITIONING SYSTEM (GPS) AND INERTIAL MEASUREMENT UNIT (IMU) DATA

FIELD OF THE INVENTION

This invention relates to vehicle-mounted sensing systems and, more particularly, to high resolution, low cost sensing systems which operate on a moving vehicle. The invention is particularly useful for airborne imaging, but is not limited to this use.

BACKGROUND OF THE INVENTION

The remote sensing market originated with early satellites and goals of global monitoring of terrestrial activities. However, the cost of data and the response times for obtaining data has limited the broad applicability of imagery for use in day-to-day business operations. Nevertheless, for relatively small scale users, such as farmers, city planners, utilities managers and forest managers, the computerized geographic information system is recognized as the information integration tool of the future. Geographic information systems include computer tools for locating geographic coordinates of points within images, for overlaying maps and images, and for making quantitative measurements, such as areas, distances and precise locations of objects, from the images. Applications as diverse as (1) a farmer selecting chemical application strategies based upon expected crop yield predictions, (2) a tax assessor directing a manual inspection of an observed dwelling addition, or (3) assessing timber yields and timber harvest costs from multiple property tracts are but a few of the numerous potential applications of imagery and geographic information systems.

The profit structure of the agricultural industry is heavily dominated by the use of chemicals (fertilizers, pesticides and herbicides), with a trend toward the use of more chemicals. However, since the EPA and world environmental organizations recognize long term hazards of unabated chemical treatments, chemical regulations are throttling the agricultural business. Of equal significance as populations increase, more land is cleared for farming, and reduced food yields per acre lead to higher deforestation and even greater threats to the environment. The recognized answer to these global scale problems is metered usage of chemicals, such that the chemicals are used where they are of maximum benefit. Metered chemical distribution systems are in wide use. However, the data to define the spatial metering values are lacking. Multispectral imagery with submeter resolution and spatial registration is required. The imagery must be available at low cost and with short response times to requests for imagery.

A satellite system known as the SPOT satellite, sponsored by the government of France, is representative of current operational satellite capabilities. This system provides 10 meter resolution panchromatic imagery or 20 meter resolution imagery in the visible/near infrared bands. Geodetic registration is accurate to 15 meters in the U.S. where ground control points are plentiful and well surveyed. Experience has shown that the response time for imagery requests is usually no better than 10 days. The drawbacks to satellite imagery include the potential for cloud coverage (⅔ of the earth is cloud covered), high costs and the inflexibility of satellite imagery collection systems. Custom tailored resolutions, spectral bands and responsiveness cannot be provided by satellite systems.

Airborne imagery is commonly used by many small scale users. Benefits of airborne imagery collection include tailorable resolution, response time and data processing methodology. Drawbacks include higher costs and the need to contract for a dedicated aircraft, flight crew and post-mission processing system.

A variety of airborne sensing and survey systems have been disclosed in the prior art. A survey system for obtaining geophysical data with aircraft using real time differential operation of the global positioning system is disclosed in U.S. Pat. No. 4,814,711 issued Mar. 21,1989 to Olsen et al. An airborne system using two color video cameras and an IR imager head mounted below the fuselage of an aircraft is disclosed in U.S. Pat. No. 5,166,789 issued Nov. 24,1992 to Myrick. Latitude and longitude information obtained from the global positioning system is recorded on each image frame. A system including a CCD camera and a global positioning system receiver for recording an image signal and position information on magnetic tape is disclosed in U.S. Pat. No. 5,267,042 issued Nov. 30, 1993 to Tsuchiya et al. A technique for airborne imaging wherein multiple overlapping images are superimposed by observing a stationary object that appears in adjacent images is disclosed in U.S. Pat. No. 5,247,356 issued Sep. 21,1993 to Ciampa. A technique for generating high resolution images from a CCD camera in an aircraft is disclosed in U.S. Pat. No. 5,251,037 issued Oct. 5, 1993 to Busenberg. A technique for generating high resolution vidicon aerial images is disclosed in U.S. Pat. No. 5,270,756 issued Dec. 14,1993 to Busenberg. An airborne contour mapping system is disclosed in U.S. Pat. No. 3,191,170 issued Jun. 22, 1965 to Lustig et al. A technique for remote sensing using inertial navigation systems and the global positioning system for referencing of remotely sensed data is described by K. P. Schwarz et al. in *Photogrammetric Engineering & Remote Sensing*, Vol. 59, No. 11, Nov. 1993, pp. 1667–1674.

The examples above are characterized by components integrated tightly to the aircraft so that a dedicated aircraft is required. None of the prior art airborne imaging systems have been practical from the viewpoint of small scale users with respect to cost, resolution, flexibility and response time.

SUMMARY OF THE INVENTION

According to the present invention, methods and apparatus for remote data collection are provided. The invention is used in a vehicle such as an aircraft or a ground vehicle. A remote data collection system in accordance with the invention comprises a directional sensor for sensing a characteristic of interest and providing sensor data representative of the characteristic of interest, a global positioning system (GPS) receiver for providing GPS data representative of position and velocity of the sensor, an inertial measurement unit (IMU) for providing IMU data representative of attitude rate and acceleration of the sensor, a processing unit and a data storage unit. The processing unit determines IMU errors in response to the IMU data and an IMU error model. The processing unit also determines geographic data referenced to the sensor data in response to the GPS data, the IMU data and the IMU errors. The sensor data and the geographic data are stored in the data storage unit for subsequent use. The sensor may comprise one or more cameras, and the sensor data may represent images.

According to another aspect of the invention, a remote data collection system for use in a vehicle comprises a stabilized platform, a directional sensor rigidly mounted to the stabilized platform for sensing a characteristic of interest and providing sensor data representative of the characteristic of interest, an inertial measurement unit (IMU) rigidly mounted to the stabilized platform for providing IMU data representative of attitude of the sensor, a control unit responsive to the IMU data for rotating the stabilized platform about at least one axis of rotation with respect to the vehicle to control the sensing direction of the sensor as the vehicle moves, a global positioning system (GPS) receiver for providing GPS data representative of position of the sensor, a processing system responsive to the GPS data and the IMU data for determining geographic data referenced to the sensor data, and a data storage unit for storing the sensor data and the geographic data for subsequent use.

The control unit may comprise a gimbal, a support member rigidly mounted to the vehicle, a first motor connected between the support member and the gimbal for rotating the gimbal about a first axis relative to the support member and a second motor connected between the gimbal and the stabilized platform for rotating the stabilized platform about a second axis relative to the gimbal. The direction of the sensor is stabilized with respect to the first and second axes as the vehicle moves. In a preferred embodiment, the vehicle comprises an aircraft, and the control unit stabilizes the sensing direction of the sensor in a vertical orientation with respect to pitch and roll of the aircraft.

All facets of the invention are optimized for low operational cost and rapid response. The sensor and the IMU are integrated to a readily detachable vehicle component (e.g. cargo door) so that no modifications to the vehicle are required. The IMU used for sensor stabilization is also used for attitude determination and navigation, thus reducing cost. A mission planning/vehicle steering command system is included to allow one man operation for cost reduction and operational ease of use.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
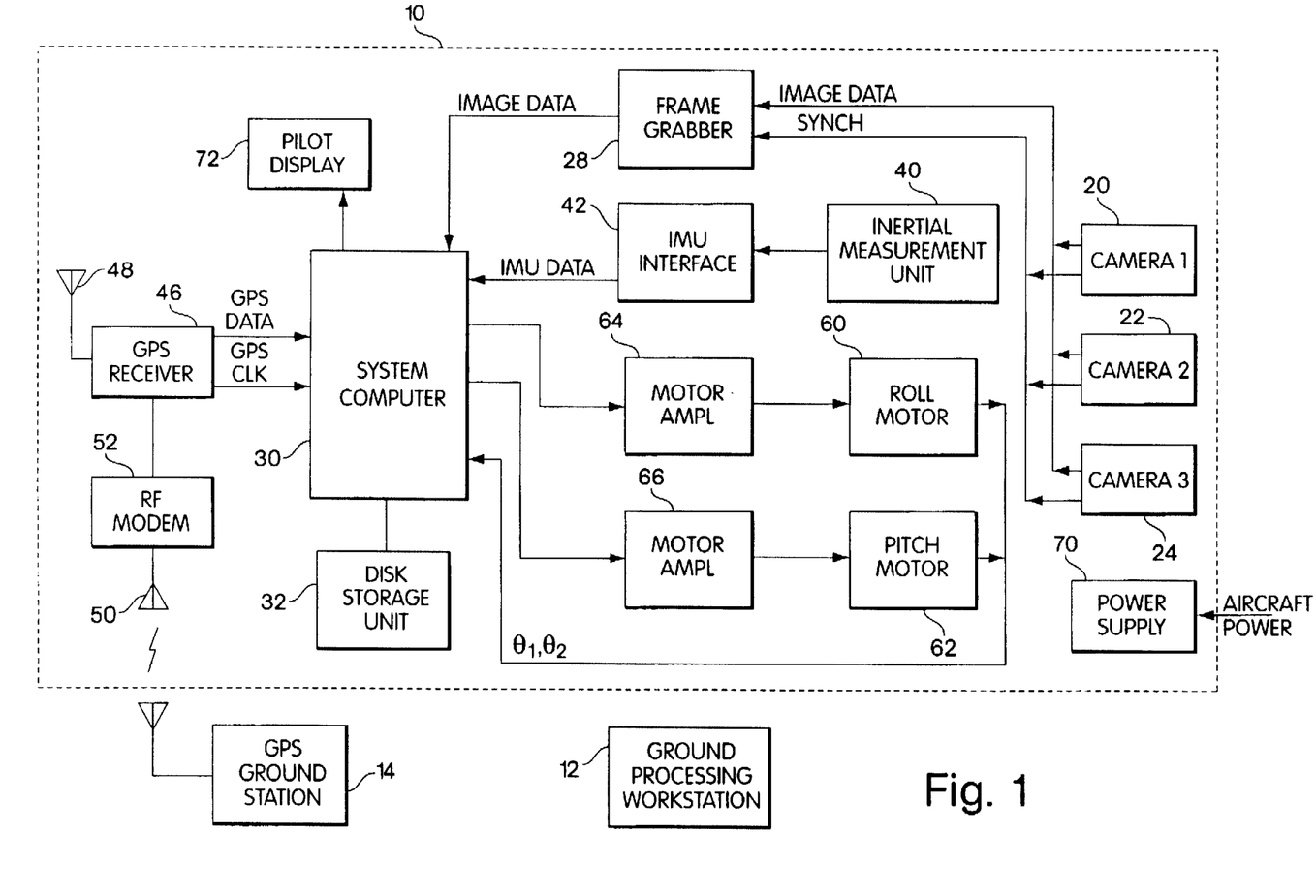
FIG. 1 is a block diagram of an embodiment of an airborne imaging system in accordance with the present invention.

A block diagram of an embodiment of an imaging system in accordance with the invention is shown in FIG. 1. The imaging system includes an airborne data collection system 10 and a ground processing workstation 12, and makes use of a GPS ground station 14. The airborne data collection system 10 is typically mounted in an aircraft and is used for obtaining images of a prescribed survey area of the earth. For example, the imaging system may be used to obtain images of a prescribed agricultural area or forest area. As described in detail below, the ground processing workstation 12 is used to define a trajectory to be followed by the aircraft in order to obtain images of the survey area with complete coverage. The ground processing workstation 12 may also be used for post-mission processing of image data and for administrative functions.

The airborne data collection system 10, in general, includes a directional sensor for generating sensor data, a global positioning system (GPS) receiver for providing GPS data representative of the position of the sensor, an inertial measurement unit (IMU) for providing IMU data representative of the attitude of the sensor, a processing unit responsive to the GPS data and the IMU data for providing geographic data referenced to the sensor data, and a data storage unit for storing the sensor data and the geographic data. The geographic data establishes the ground coordinates of the sensor data with high resolution. The airborne data collection system 10 may include a stabilized platform assembly for stabilizing the direction of the sensor during aircraft flight. The data collection system of the invention may be used in ground vehicles as well as in aircraft.

Referring again to FIG. 1, an embodiment of the airborne data collection system 10 includes cameras 20, 22 and 24. The cameras 20, 22 and 24 may, for example, be charge coupled device (CCD) cameras with filters having different spectral responses. The cameras 20, 22 and 24 supply image data and synchronization signals to a frame grabber 28. The frame grabber 28 supplies image data representative of individual images obtained by each of the cameras to a system computer 30. A disk storage unit 32 connected to the system computer 30 is used for storage of image data and geographic data. The airborne data collection system 10 further includes an inertial measurement unit 40 that provides IMU data to the system computer 30 through an IMU interface 42. The inertial measurement unit 40 is rigidly mechanically connected to cameras 20, 22 and 24 and typically senses acceleration and rotation rate with respect to three coordinate axes. A GPS receiver 46 receives positioning signals from GPS satellites through a GPS antenna 48. The GPS receiver 46 also receives positioning signals from the GPS ground station 14 through a data link antenna 50 and an RF modem 52. The GPS receiver 46 supplies GPS data and a GPS clock to the system computer 30. As known in the art, the GPS data accurately represents the position of GPS receiver 46 and therefore represents the position of cameras 20, 22 and 24. The system uses differential GPS for steering the vehicle to accuracies of 1–3 m. A kinematic GPS processing procedure is applied post-mission to allow determination of position accuracy to the 10 cm level.

When the airborne data collection system 10 includes a stabilized platform assembly, at least one stabilizing motor is provided. In the example of FIG. 1, a roll motor 60 stabilizes the cameras 20, 22 and 24 with respect to aircraft roll, and a pitch motor 62 stabilizes cameras 20, 22 and 24 with respect to aircraft pitch. Roll motor 60 is energized by system computer 30 through a motor amplifier 64, and pitch motor 62 is energized by system computer 30 through a motor amplifier 66. Each of the motors 60 and 62 includes an encoder which provides to system computer 30 a signal representative of motor angle with respect to a reference angle. Operation of the stabilized platform assembly is described in detail below. A power supply 70 receives aircraft power, typically 28 volts, and supplies operating power to the components of the airborne data collection system 10. A graphical display 72 is connected to system computer 30. As described below, the display 72 provides commands to the pilot when the aircraft deviates from a preplanned trajectory over the survey area.

Figure 2:
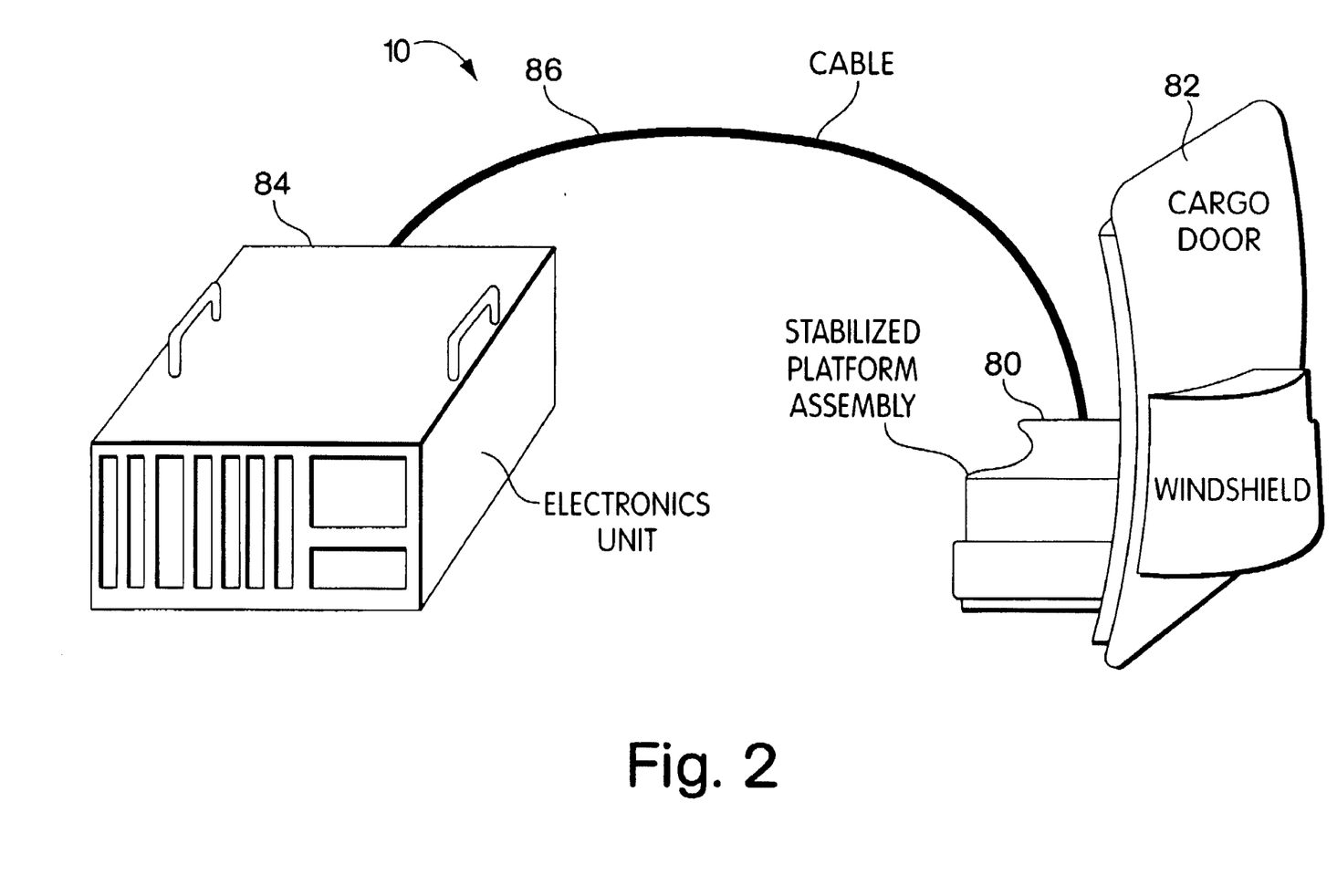
FIG. 2 is a pictorial diagram showing the components of the airborne imaging system of FIG. 1.

FIG. 2 is a pictorial diagram that illustrates a preferred configuration of the airborne data collection system 10. A stabilized platform assembly 80 includes cameras 20, 22 and 24, IMU 40, motors 60 and 62 and additional components described below. In a preferred embodiment, the stabilized platform assembly 80 is mounted to a cargo door 82 of an aircraft (not shown in FIG. 2). The airborne data collection system 10 further include electronics unit 84. The electronics unit 84 includes system computer 30, disk storage unit 32, GPS receiver 46, RF modem 52, frame grabber 28, IMU interface 42, motor amplifiers 64 and 66, power supply 70 and display 72. The electronics unit 84 is interconnected to stabilized platform assembly 80 by a cable 86.

Figure 3:
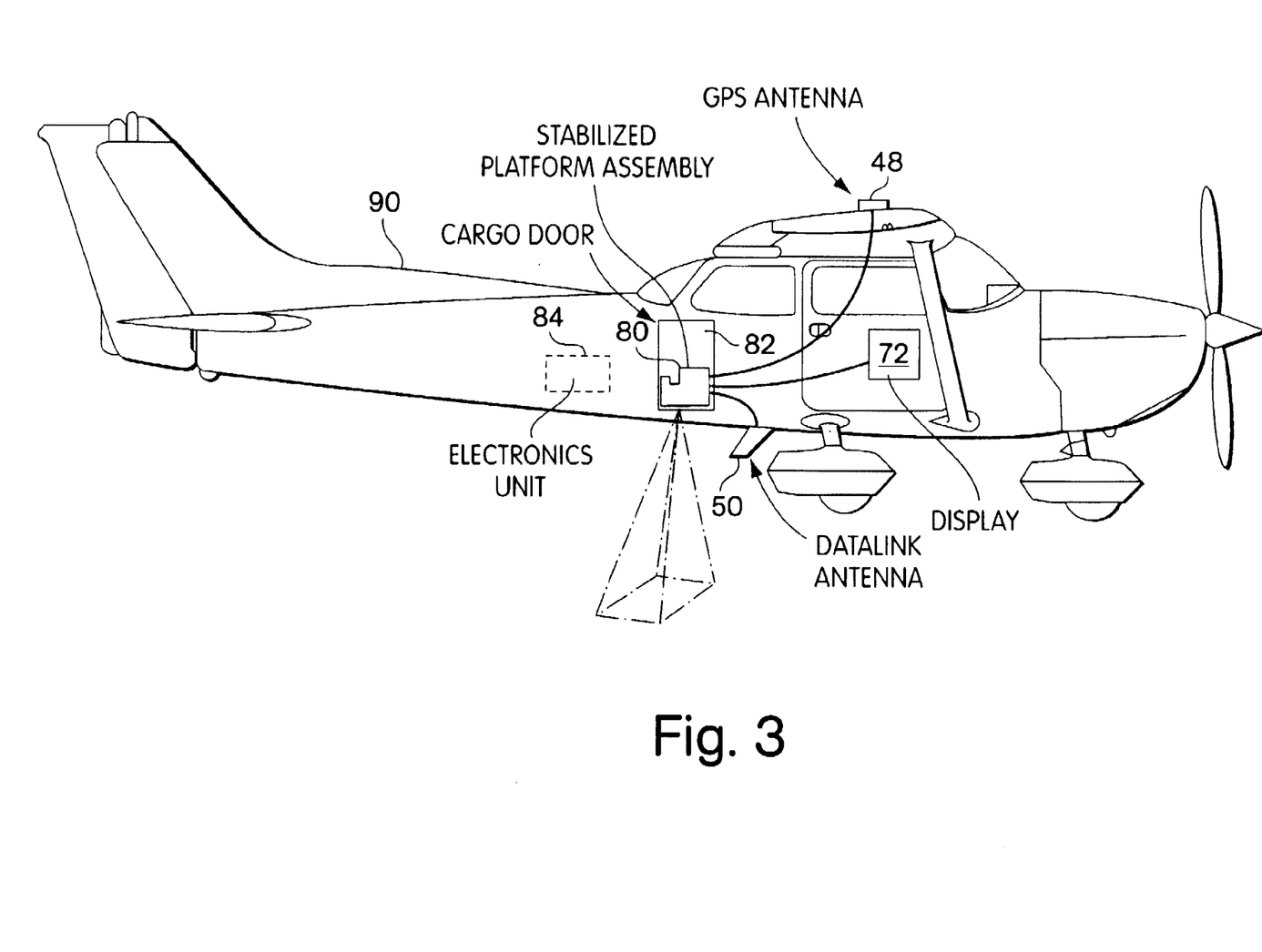
FIG. 3 is a pictorial diagram illustrating the airborne imaging system of FIG. 1 installed on an aircraft.

FIG. 3 is a pictorial diagram illustrating installation of the airborne data collection system of the present invention in an aircraft 90. As indicated above, stabilized platform assembly 80 is preferably mounted on cargo door 82. Electronics unit 84 is positioned in the cargo area of the aircraft 90. GPS antenna 48 may be mounted on the upper surface of the aircraft, and data link antenna 50 may be mounted on the underside of the aircraft. The graphical display 72 is positioned for convenient viewing by the pilot.

Figure 4:
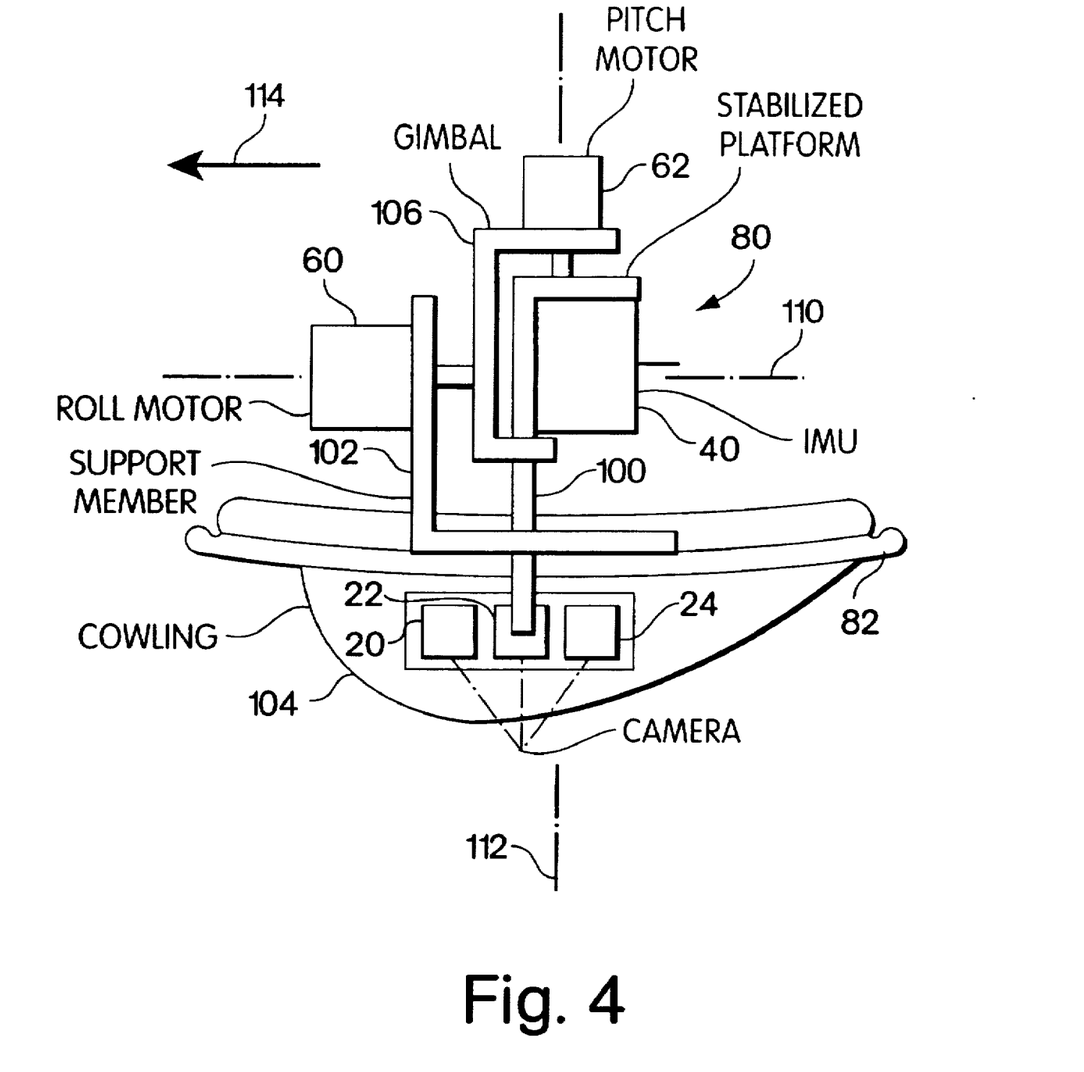
FIG. 4 is a top schematic view showing the stabilized platform assembly mounted on the door of an aircraft.
Figure 5:
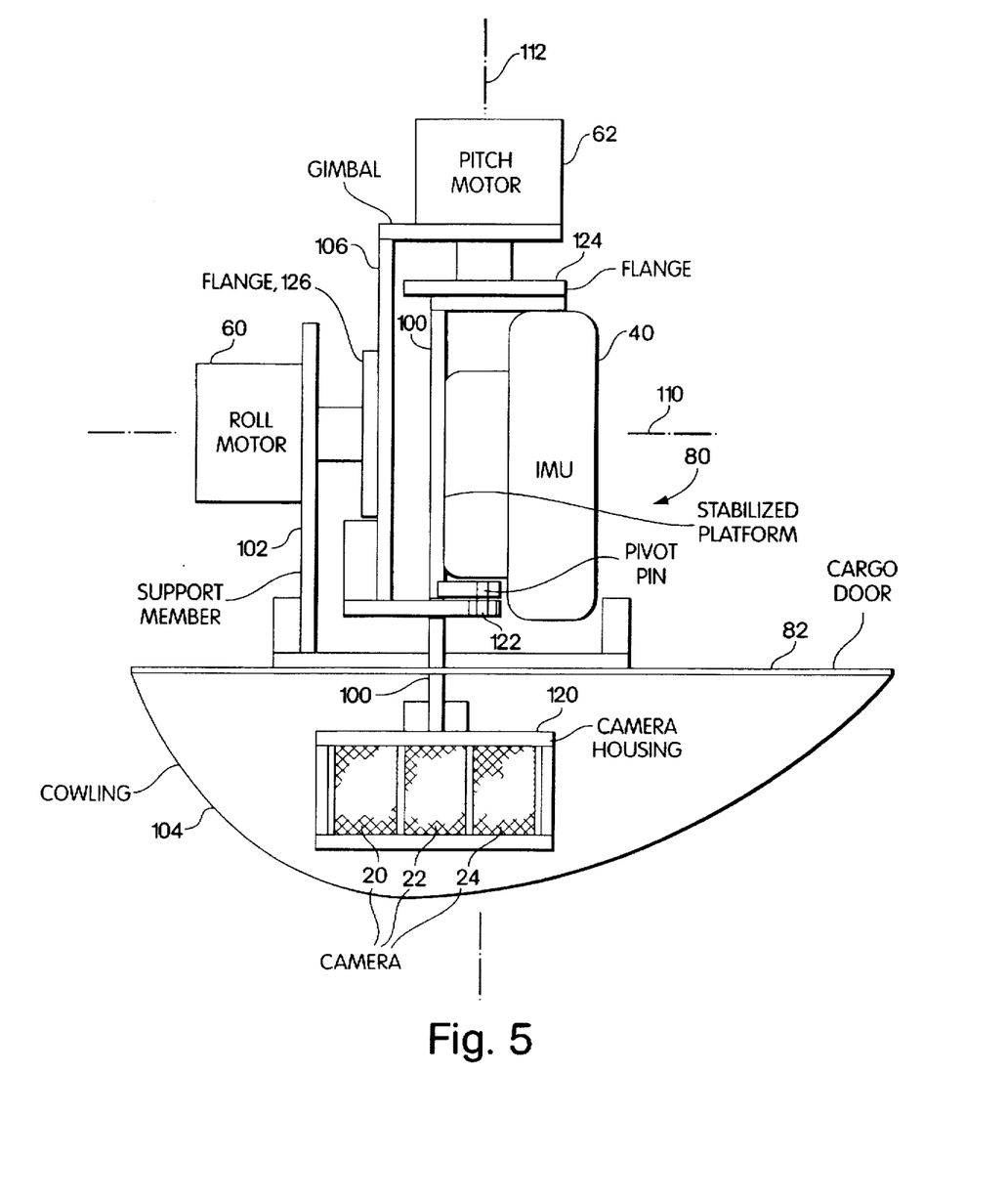
FIG. 5 is a top view showing the stabilized platform assembly in more detail.
Figure 6:
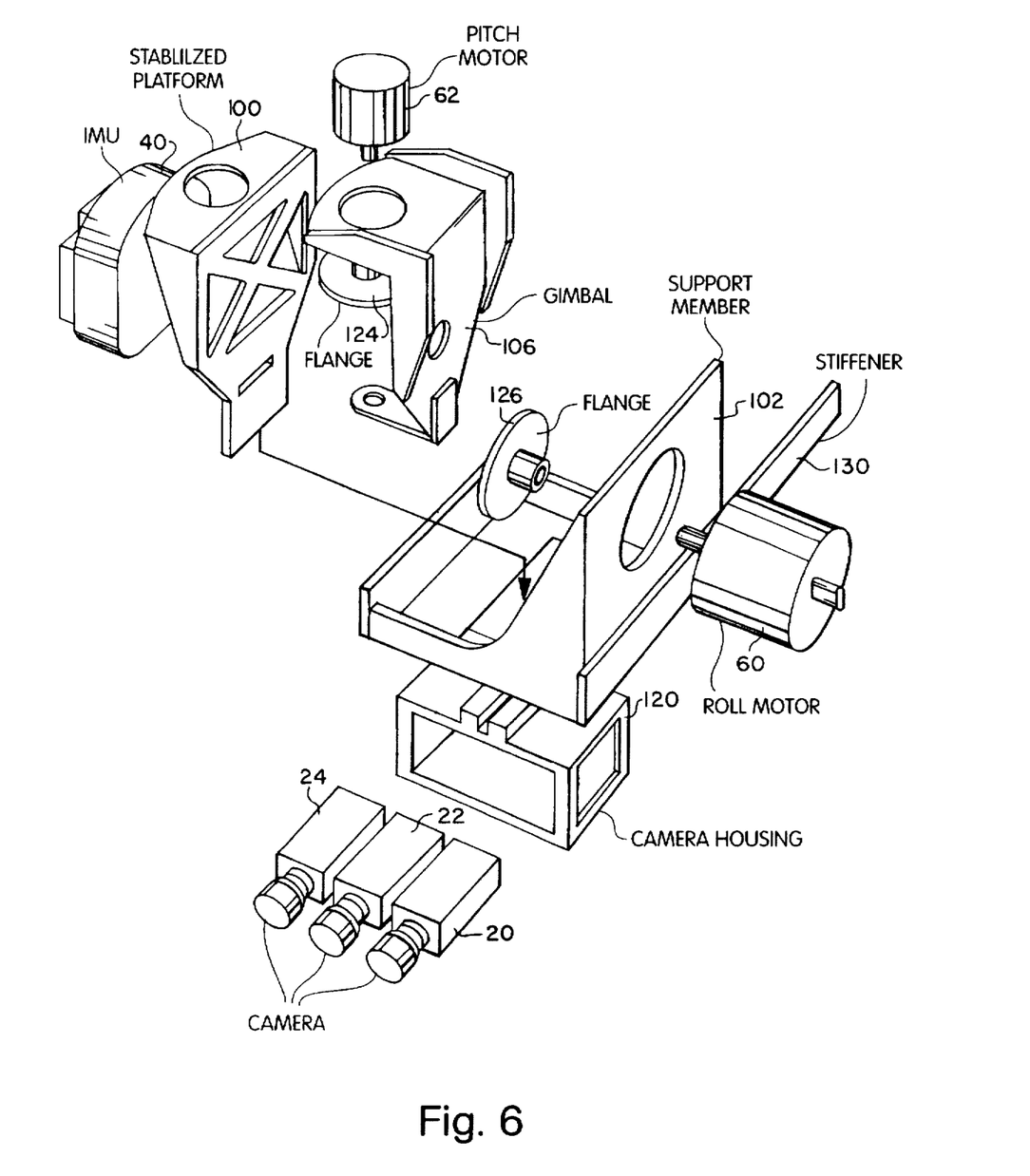
FIG. 6 is an exploded view of the stabilized platform assembly.

FIG. 4 is a pictorial diagram of the stabilized platform 80 mounted on cargo door 82. FIG. 5 shows the stabilized platform assembly in more detail, and FIG. 6 shows an exploded view of the stabilized platform assembly. Cameras 20, 22 and 24 are rigidly mounted to a stabilized platform 100. The stabilized platform 100 extends through an opening in cargo door 82 such that cameras 20, 22 and 24 are located externally of the aircraft. The opening in cargo door 82 provides sufficient clearance to permit movement of stabilized platform 100 with respect to the aircraft. In a preferred embodiment, the opening is a vertically-oriented slot to permit pitch and roll stabilization of the cameras. The cameras 20, 22 and 24 are protected by a cowling 104 that is open at the bottom. The IMU 40 is rigidly mounted to a portion of stabilized platform 100 within the aircraft. A support member 102 is mounted to an inside surface of cargo door 82, and roll motor 60 is secured to an inwardly-extending portion of support member 102. The shaft of roll motor 60 is connected to a gimbal 106. Pitch motor 62 is mounted to gimbal 106, and the shaft of pitch motor 62 is secured to stabilized platform 100. As shown in FIGS. 5 and 6, cameras 20, 22 and 24 are mounted in a camera housing 120, which is attached to stabilized platform 100. Stabilized platform 100 is connected to gimbal 106 by a pivot pin 122 and is connected to the shaft of pitch motor 62 by a flange 124. Gimbal 106 is connected to the shaft of roll motor 60 by a flange 126. When the roll motor 60 is energized, cameras 20, 22 and 24, stabilized platform 100, IMU 40, gimbal 106 and pitch motor 62 are rotated with respect to a roll axis 110. When the pitch motor 62 is energized, cameras 20, 22 and 24, stabilized platform 100 and IMU 40 are rotated with respect to a pitch axis 112. The nominal direction of flight of the aircraft is indicated in FIG. 4 by arrow 114.

In an example of the stabilized platform assembly 80, the roll motor 60 was a Hathaway type HT03802 brushless DC motor, and the pitch motor 62 was a Hathaway type HT02301 brushless DC motor. The motor amplifiers 64 and 66 were Hathaway type BLC048 motor amplifiers.

In operation, the IMU 40 senses changes in velocity and angle in three coordinate directions. Since cameras 20, 22 and 24 and IMU 40 are rigidly connected to stabilized platform 100, velocity changes and angle changes sensed by IMU 40 represent velocity and angle changes of cameras 20, 22 and 24. IMU data representative of the velocity and angle changes is supplied to system computer 30. The system computer 30 uses the angle changes to determine deviations of the attitude of the cameras from a desired attitude. These deviations are used to generate error signals which are supplied through motor amplifiers 64 and 66 to roll motor 60 and pitch motor 62, respectively. The roll motor 60 rotates cameras 20, 22 and 24 with respect to roll axis 110, and pitch motor 62 rotates cameras 20, 22 and 24 with respect to pitch axis 112, so as to maintain a desired attitude. Typically, the cameras 20, 22 and 24 are maintained in a vertical attitude with respect to the earth's surface. However, other boresight directions may be utilized. Furthermore, the cameras may be scanned, for example, with respect to the roll axis 110 to obtain images of a wider strip on each pass over the survey area.

The stabilized platform assembly 80 provides advantageous operation of the imaging system. Because the cameras 20, 22 and 24 are stabilized, typically in a vertical orientation, the spacing between adjacent aircraft passes over the survey area can be increased without risking loss of coverage between images in adjacent passes. This is possible because it is not necessary to account for inadvertent aircraft roll in determining the spacing between passes. By increasing the spacing between adjacent passes of the aircraft trajectory, the time and cost for completing a given survey is reduced. In an alternative approach, the cameras are scanned with respect to the roll axis at a rate relative to the aircraft speed which permits imaging of a wider strip than is possible with stationary cameras.

The stabilized platform assembly 80, shown in FIGS. 4-6 and described above, provides stabilization with respect to the pitch and roll axes of the aircraft. In another configuration, the stabilized platform assembly is simplified to provide stabilization with respect to the roll axis only. In this configuration, the shaft of roll motor 60 may be connected directly to stabilized platform 100 so as to rotate cameras 20, 22 and 24 with respect to roll axis 110. It is believed that stabilization of the cameras 20, 22 and 24 with respect to the yaw axis (perpendicular to axes 110 and 112) would not provide substantial benefits in the operation of the imaging system.

Mounting of the stabilized platform assembly 80 on the aircraft door provides significant practical advantages in operation of the imaging system. In general, it is desired to install the imaging system of the present invention in arbitrary aircraft. One alternative is to install the cameras in a hole cut in the floor of the aircraft. However, this requires a special modification to the aircraft and requires certification of the installation by the FAA. Such a hole is unlikely to be acceptable to many aircraft owners. Wing mounting of the camera assembly is undesirable for similar reasons. Mounting of the stabilized platform assembly on the cargo door provides an attractive solution. Cessna 172 aircraft, for example, have a cargo door that is easily removable. Other small, four-passenger commercial aircraft have a similar cargo door which may be modified for installation of the stabilized platform assembly. A 6×6 inch hole is cut in the lower interior portion of the dual wall aluminum door structure. The support member 102, having a box structure, is used to carry torque from the pitch and roll motors. A torque transfer stiffener 130 (FIG. 6), 14 inches in length, is part of the support member 102 and transfers the roll motor torque in the vertical plane of the door. A vertically-oriented slot is cut in the door to allow the camera support portion of the stabilized platform 100 to pass through the door to the exterior of the aircraft. When the imaging system of the invention is to be used in an aircraft, the standard cargo door is removed and is replaced with a cargo door having a preinstalled stabilized platform assembly. The electronics unit 84 is placed in the cargo area of the aircraft.

The cameras used in the imaging system may include three compact monochrome CCD cameras. Such cameras are available from numerous suppliers. A preferred camera is the Sony XC-7500, which provides 640×480 pixel resolution in non-interlace (progressive scan) mode. The cameras typically use a 16 mm lens with an f-stop of 2.8. Different filters can be utilized in the camera lens to provide different spectral responses. For example, red, green, blue and near infrared filters may be utilized to obtain different information regarding the survey area. A color image can be formed by using red, green and blue filters. The frame grabber may be a Mu-tech model M-1000 which allows access to up to 4 cameras simultaneously.

The imaging system has been described thus far with reference to a configuration utilizing three cameras. It will be understood that any number of cameras may be utilized. More generally, any sensor having a boresight direction for sensing may be utilized for data collection. Thus, for example, the sensor may be a laser system, an atmospheric pollution sensor, a thermal camera, a radar system or any other suitable sensor.

The IMU may be a Honeywell H-1700 system, which has an accuracy characterized by 10° per hour gyro accuracy. While higher accuracy IMU's are available, the cost is also higher. In order to utilize a low-cost IMU with moderate accuracy, an error model of the IMU is utilized as described below.

The GPS receiver 46 may comprise an eight-channel Motorola Encore airborne unit, and the GPS ground station 14 may comprise an 8-channel Motorola Encore differential GPS base station. The Motorola Encore is a C/A code unit with capability for using differential corrections transmitted by the base station. The GPS receiver 46 is connected by a coaxial cable to GPS antenna 48, installed on the upper surface of the aircraft. A true kinematic GPS system is a preferred implementation to achieve accuracies of 10 cm or better.

The RF modem 52, which provides the differential GPS datalink to GPS ground station 14, may be a Pacific Crest RFM 96S radio modem, capable of two-way communication at 9600 baud using a carrier frequency of 460 MHz. This system provides approximately a 100 mile radius of coverage with a 15 watt transmitter and omnidirectional datalink antenna 50.

The system computer 30 may comprise an industry standard model PCI single board computer, which utilizes a P5 150 MHz processor. I/O functions are handled by a model ATC40 carrier board available from Greenspring, which provides four Industry Pack (IP) board slots for tailoring the I/O functions performed by the board. One IP board is the IP-ADIO available from Greenspring, which provides analog-to-digital, digital-to-analog and discrete digital I/O functions. This IP board receives IMU data and the GPS clock and supplies motor control signals to the motor amplifiers 64 and 66. An IP servo board decodes the motor encoder signals received from roll motor 60 and pitch motor 62.

The disk storage unit 32 must have sufficient storage volume and a sufficient data transfer rate to store image data supplied by the frame grabber 28. Consider an airborne mission requiring one foot per pixel image resolution and an aircraft speed of 100 knots at one frame per second. The 640×480 pixel single camera image frame provides a 65% overlap between images (480 pixel dimension along direction of motion). At one byte per pixel for each of the three cameras, a data storage rate of 0.92 megabyte per image, or 0.92 megabyte per second, is required. A conservative 1.5 megabyte per second storage rate is used as the nominal image storage transfer rate specification.

A nominal time for an imaging survey mission may be 3 hours, with over 2 hours assumed for actual image collection. The remaining time is spent flying to and from the survey area and for turnarounds after completion of each swath. Two hours of imaging will generate a 7.2 gigabyte imagery file at a 1.0 megabyte per second storage rate. The GPS data and IMU data recorded during the mission (0.04 megabyte per second for 3 hours) contributes only 0.4 gigabyte of additional storage, for a total. of 7.6 gigabytes. One example of a suitable disk unit is the Seagate Elite-9, having 9 gigabytes of storage and 11 milliseconds access time. The standard SCSI disk drive interface allows storage throughput up to 1.5 megabytes per second.

The imaging system of the present invention utilizes direct digital photography and digital storage of spatially registered imagery. Other airborne video systems use a videotape system as the airborne image storage medium. This allows several hours of imagery to be captured at a 30 Hz image rate. However, videotape does not capture the full resolution or the full dynamic range of the CCD camera systems. All known airborne video systems offer videotape of the surveyed terrain, with frames tagged with GPS positions.

The system uses a display to provide steering cues to the pilot to maintain the appropriate flight line. An Accuphoto system provided by Genysis Comm. Inc. is used for this purpose. The Accuphoto system provides a software tool for use in planning the mission, resulting in a software file defining the mission profile in GPS coordinates. The onboard GPS receiver is then used to provide pilot cues via a simple LCD display indicating need for a left/right correction and the magnitude of the correction.

The configuration described above wherein stabilized platform assembly 80 is mounted on a cargo door of the aircraft provides a number of advantages in operation of the imaging system. However, other configurations may be utilized within the scope of the present invention. For example, the stabilized platform assembly may be omitted from the imaging system. In this configuration, the cameras are rigidly mounted to the aircraft, and the IMU data is used to compensate the image data for aircraft pitch, roll and yaw. Furthermore, the cameras or other sensors are not necessarily mounted on the aircraft door. For example, the cameras may be mounted in a hole in the floor of the aircraft, in a pod beneath the aircraft or on one of the wings.

Figure 8:
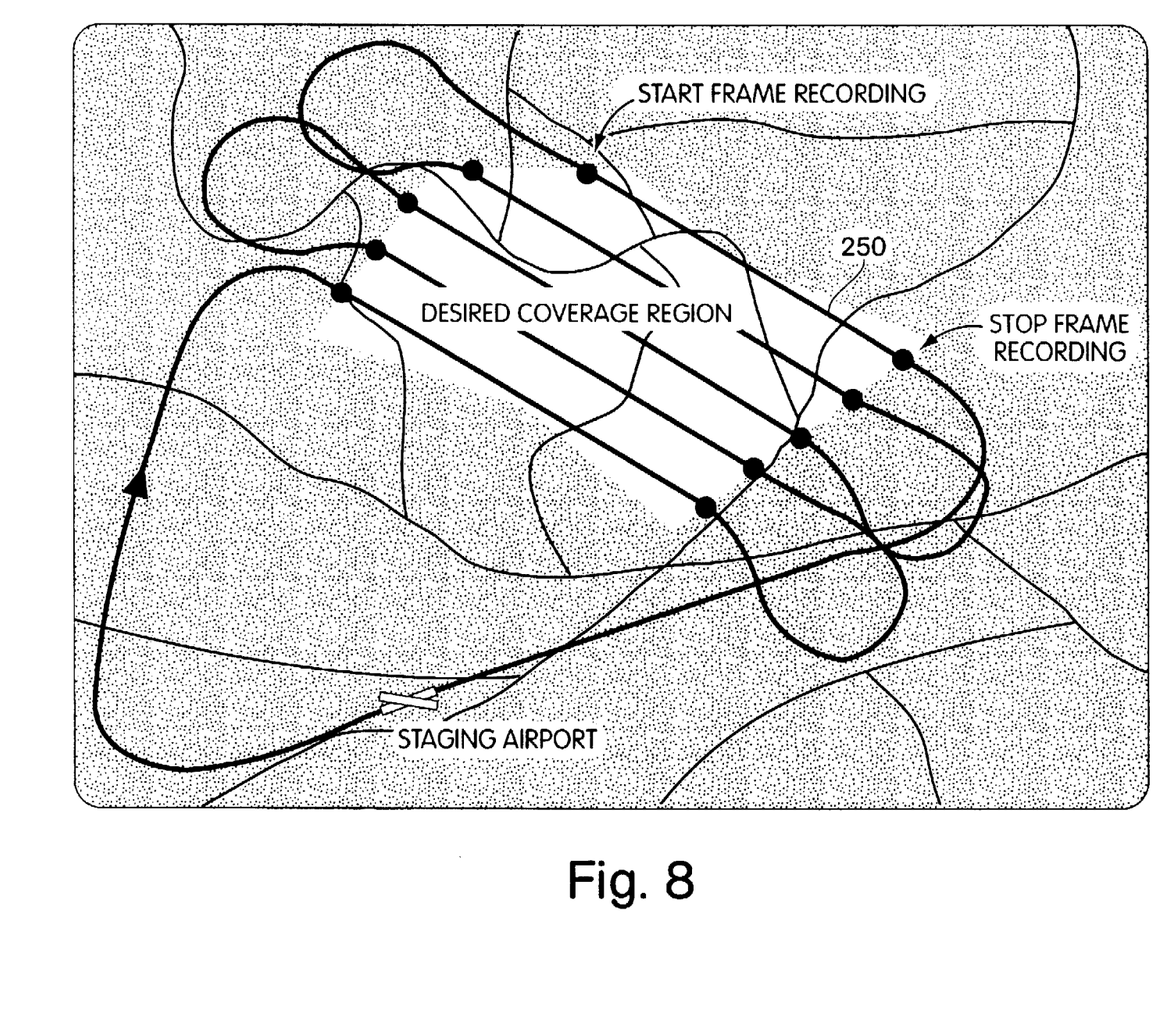
FIG. 8 is a pictorial diagram that illustrates an example of an airborne survey mission.

The ground processing workstation 12 performs survey mission planning and post-mission processing. The ground processing workstation 12 may be implemented using a PC-based graphical workstation and commercially available geographic information system tools (GIS) such as Arcview available from ESRI. Several mission planning functions are provided by the ground processing workstation. It allows the user to view a digital line graph (map) database, available from commercial sources, depicting the survey area of interest. The user selects the boundary points to define the survey area selected for mission coverage. An aircraft trajectory is computed from a takeoff point to the survey area with sufficient passes over the survey area to provide a high probability of coverage of the selected area at a specified resolution and aircraft flight time. Multiple missions are prescribed where required. The aircraft trajectory is displayed to the user superimposed over a digital map of the area of interest. The aircraft trajectory, defined by waypoints, and image collection start/stop times are stored on a floppy disk for entering into the airborne data collection system 10. System parameters such as camera setup parameters (frame resolution and angular field of view), aircraft parameters (endurance, velocity and turn radius) and mission descriptors (airport location and percent frame overlap) may be modified. An example of a mission trajectory 250 is illustrated in FIG. 8.

Post-mission processing functions of the ground processing workstation 12 include extracting data front the disk storage unit 32 of the airborne data collection system 10, registration of the individual images onto a geodetic reference frame and combining the images into a contiguous imagery file stored in a standard GIS format. The post-processing functions use GIS tools that are similar to those used for mission planning. The mass storage media in the ground processing workstation 12 is compatible with the disk storage unit 32 in the airborne data collection system 10. Files in the disk storage unit 32 may be copied to the mass storage system in the ground processing workstation 12. The ground processing workstation accesses the stored files and registers each file individually into the ground plane. Multiple neighboring individual images from a single mission can be overlaid onto a common geodetic grid. All or a selected subset of the image frames may be mosaiced onto a geodetic reference grid. GIS tools may be used to scroll, zoom and perform measurements on the mosaiced imagery. Imagery operations may be performed individually or on weighted combinations of the images from the three cameras.

In one operating mode, the end user makes arrangements to lease an aircraft and performs mission planning. Using the ground processing workstation 12, the user lays out the survey area to be imaged by selecting boundary points on a digital map. As indicated above, the ground processing workstation considers the endurance and turning properties of the aircraft to be used, the base airport location and camera parameters. This allows the automatic design of a three-dimensional trajectory for the aircraft, with image collection points selected for ideal coverage of the survey area. The trajectory, or multiple mission trajectories, is presented to the user for approval. Higher resolution requirements require more passes and possibly additional missions. A three-hour mission with two hours of the flight time collecting image data provides over 20,000 acres (32 square miles) of image coverage at a one foot image resolution.

Following the trajectory design stage, the user obtains from the ground processing workstation a floppy disk that contains the digital specifications of the trajectory (X, Y, Z position versus time) and the image collection points. The airborne data collection system is installed on the aircraft, and a checkout of all subsystems is performed automatically. Upon valid checkout, the aircraft is ready to begin the mission. The pilot display leads the pilot through the mission from takeoff to landing, although the pilot can exit and re-enter the trajectory waypoint files at any time, if desired. The display also provides the current status of the mission, for example, flight legs completed, time to next turn, loss of GPS lock, or the occurrence of any anomalies which might result in loss of data.

During image frame recording over the survey area, image data from the cameras 20, 22 and 24 is stored on the disk storage unit 32. The stabilized platform assembly maintains the cameras in a vertical orientation as described above. GPS data, representative of position of the cameras, and IMU data, representative of attitude of the cameras, is simultaneously stored on the disk storage unit 32. Each image frame has corresponding GPS data and IMU data, so that the image data may be spatially registered with high accuracy.

After the mission is completed, the airborne data collection system may be deinstalled from the aircraft. The electronics unit 84 can be connected to the ground processing workstation 12, so that the stored data may be transferred to the ground processing workstation. The individual image frames are transferred to the storage media in the ground processing workstation and are registered in the ground plane using the GPS data and IMU data stored with the images. The image data can immediately be registered because position coordinates for each image pixel are known. This allows preparation of a contiguous registered image of the survey area and review of this image on the workstation using standard GIS tools. Maps showing roads, cultural features, hydrology and the like can easily be overlaid on the image. The user can now use the image in any desired manner.

In the above scenario, the end user was responsible for all aspects of the survey mission. In other scenarios, an airborne imaging service may be established to support a higher volume operation. In this case, the service organization may offer mission planning support to users or may accept mission description disks from users who operate their own ground processing workstations. For example, an individual farmer or chemical supplier may request once per week imagery of his acreage to precisely time harvest and/or chemical application for maximum yield.

The software in the system computer 30 of the airborne data collection system 10 is required to perform the following functions. The IMU data is processed to provide a strapdown navigation solution propagating the position, velocity and attitude of the camera axes. The strapdown navigation solution is combined with the GPS velocity data to provide a transfer alignment resulting in the attitude of the camera boresight relative to North, East and down. The three CCD cameras are commanded to obtain imagery in a synchronous manner with the GPS data and the IMU data. Precise GPS timing is used to synchronize all data collection functions. A trajectory manager monitors the current aircraft position relative to the desired trajectory and provides commands to the pilot indicating the degree of error in horizontal and vertical planes. The two-axis stabilization system uses the measured camera boresight attitude, IMU rotation rates and motor encoder values to control the camera axes to point in a commanded direction, nominally down. The image frame data, GPS data, IMU data, attitude solution and system help status are logged on the disk storage system.

Figure 7:
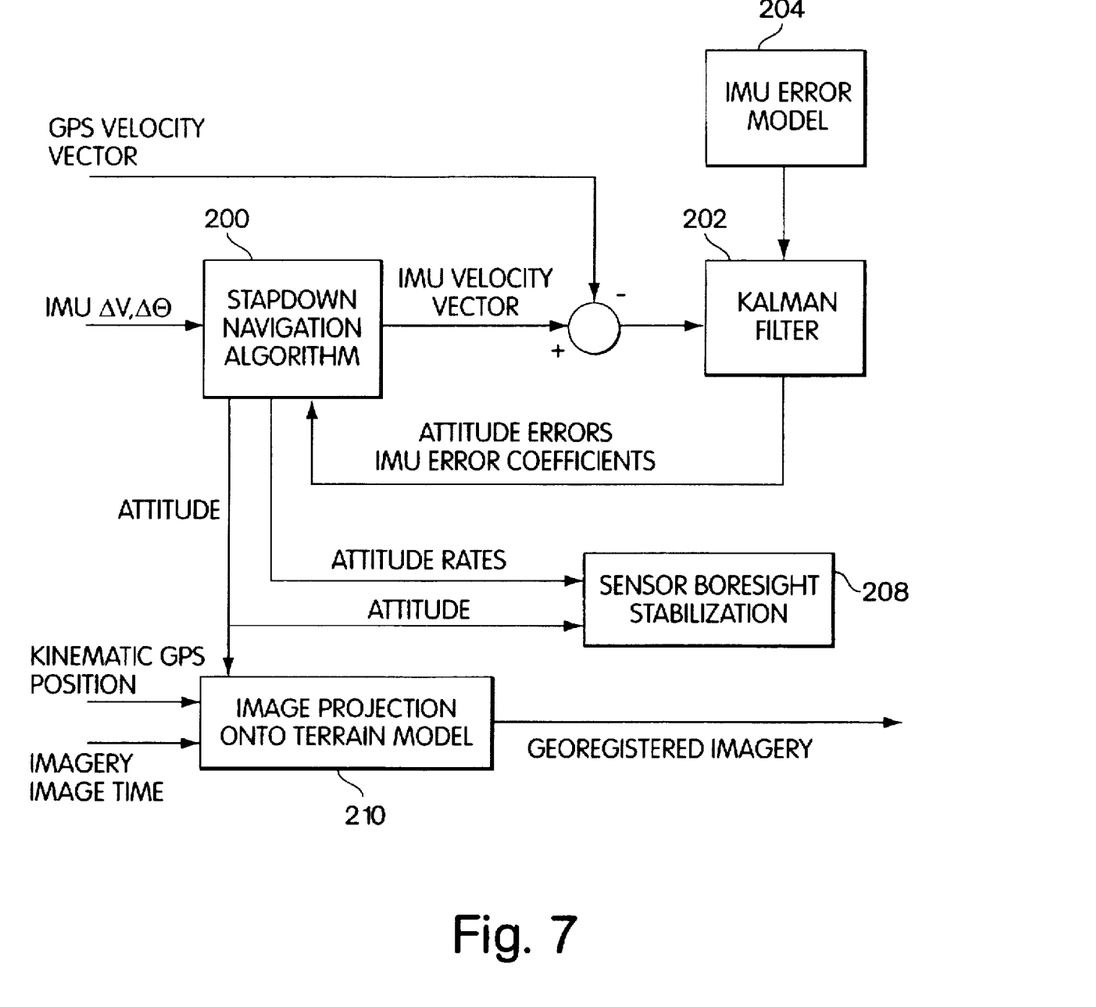
FIG. 7 is a software flow diagram that illustrates operation of the airborne imaging system.

A block diagram that illustrates the interrelationship of the software modules in the airborne data collection system is shown in FIG. 7. A strapdown navigation routine 200 propagates the position, velocity and attitude of the IMU coordinate axes forward in time at a data rate of 100 Hz using digital measurements of change in velocity and change in angle. The inputs to the routine 200 are the IMU data samples at a 100 Hz rate and initialization values for the IMU attitude. Additionally, attitude error values are input from the transfer alignment Kalman filter 202. The outputs are (1) latitude, longitude and altitude, (2) North, East, down components of velocity, and (3) attitude Euler angles (roll, pitch and yaw) relating the IMU axes to the North, East and down axes.

The transfer alignment Kalman filter 202 merges the GPS velocity measurement and the strapdown navigation routine output to produce an estimate of the error in the IMU axes attitude computation. Inputs include the GPS velocity measurements and the strapdown navigation solution synchronized in time. Additionally, the lever arm (in aircraft body axes) from the GPS antenna phase center to the IMU location is required. Finally, an IMU error model 204 representing the statistics of the IMU errors is also required. The transfer alignment process utilizes a Kalman filter formulation based upon the IMU error model. The outputs include the IMU attitude errors which are supplied to the strapdown navigation routine 200 as corrections. Errors in the IMU gyro and accelerometer instruments are logged to address the IMU in-flight performance.

A sensor boresight stabilization module 208 processes IMU attitude rates, motor encoder values and IMU attitude data to control the pitch and roll motors so as to properly point the camera boresight to the desired direction. Inputs include motor encoder values, IMU rotation rates, strapdown navigation attitude, Euler angles and timing signals from the IMU interrupt. The stabilization module includes two linear control systems identical in structure but having different gains to accommodate the different inertias presented to the motors. Stabilization is performed at a 100 Hz data rate synchronized with the IMU interrupt. A conventional proportional integral derivative control is used. The proportional term comes from the pitch or roll attitude errors, and the derivative terms come from the IMU rate gyro measurements. Coordinate transformations must be applied to both the Euler angles and the rotation rates to account for the specific Euler angle set mechanized by the gimbal. The control gains are selected by a knowledge of the various control inertias, motor gain, and the amplifier gain and the selected bandwidth of the control loops. The pitch and roll bandwidths are selected at 10 Hz. The motor used within the conformably used within the control loop. However, this data is used to determine the orientation of the IMU axes relative to the aircraft for lever arm calculations and to determine the proximity of the gimbals to their mechanical limits.

An image projection module 210 manages camera image frame collection and buffer storage. Inputs include frame time synchronization from the IMU 100 Hz interrupt, image memory addresses, kinematic GPS position and attitude angles from the strapdown navigation routine 200. The image synchronization is controlled by the IMU interrupts at 100 Hz with nominal frame rates of 1 to 2 Hz, i.e. 50 to 100 IMU samples between frame collection events. The frame collection commands use Mu-tech routines which provide frame triggering and synchronization of the three cameras. The outputs are memory mapped image frames for the three CCD cameras.

The real-time software consists of three modules: 1) the strapdown navigation routine 200, 2) the transfer alignment routine implemented in Kalman filter 202, and 3) the gimbal command routine implemented in the sensor boresight stabilization module 208.

The strapdown navigation routine 200 consists of integration of 6-degree-of-freedom equations with a body-fixed coordinate system. The body coordinate system has the z-axis fixed to the camera boresight axis, the x-axis nominally pointed forward and the y-axis to the right of the motion. The internal coordinate system used for navigation is the Earth-Centered-Earth-Fixed (ECEF) system. Accelerations and rotation rates are integrated from the initial assumptions of attitude and using the GPS measured velocity components. The equations consider a WGS-84 datum for all computations for compliance with GPS. The strapdown computations are performed at a 100 Hz rate, which coincides with the availability of the IMU data. The transfer alignment routine implements a 22 state Kalman filter with stages of Covariance Propagation and state/covariance update at each measurement. The filter states include velocity errors, attitude errors, accelerometer biases, gyro biases, accelerometer scale factor errors, gyro scale factor errors with each of these error terms containing x, y, and z components (18 individual terms). An additional state is used to represent the time latency between the GPS and IMU measurement devices. Three additional states are used to represent the time-integral of the velocity (average velocity) over a 200 msec window prior to each GPS one pulse-per-second (1 PPS) time point. This velocity average is used to model exactly the functioning of the specific GPS receiver used in the preferred embodiment. The Kalman filter propagates elements of the covariance matrix and state between each 1 PPS GPS time and performs a covariance and state update at each GPS time. The resulting attitude errors and IMU instrument errors are fed back into the strapdown navigation routine 200 to act as a continuous source of calibration. This allows use of small, low-cost IMU devices which are currently being manufactured by several vendors.

The pitch and roll motors are controlled by a conventional proportional, integral, derivative (PID) controller implemented in the gimbal command routine. The rate gyros from the IMU provide the necessary rate feedback and the transfer alignment, coupled with the strapdown navigation routine, provides the position feedback. The three PID gains are derived from knowledge of the inertias and desired bandwidth of the closed loop system. This pointing system differs from conventional systems in that the IMU used for navigation is placed on the inner gimbal of the stabilized platform, which is also directly attached to the camera/sensor package. This is enabled by availability of small, low-cost IMU components, direct drive servo motors and camera sensors.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An imaging system for use in an aircraft, said imaging system comprising:

a stabilized platform that is carried by the aircraft and is rotatable, relative to the aircraft, about at least one axis of rotation;

a camera system rigidly mounted to said stabilized platform for providing image data representative of a ground survey area, said camera system having a boresight direction;

an inertial measurement unit (IMU) rigidly mounted to said stabilized platform for providing IMU data representative of attitude of said camera system, said IMU having IMU coordinate axes;

a global positioning system (GPS) receiver for providing GPS data representative of position of said camera system;

a processing unit comprising means for generating an IMU error model for use determining attitude errors, means responsive to said IMU data and said IMU error model for providing attitude data that is corrected for said attitude errors, comprising a strapdown navigation routine that propagates position, velocity and attitude of the IMU coordinate axes forward in time using measurements of change in angle, and a transfer alignment Kalman filter that merges the velocity measurement and an output of the strapdownn navigation routine to produce an estimate of the attitude errors in the IMU attitude data, and means responsive to said GPS data, said attitude data and said image data for providing georegistered image data comprising corresponding sets of said image data, said GPS data and said attitude data, wherein each frame of said image data is registered by said GPS data and said attitude data to said ground survey area;

a control unit responsive to said attitude data for rotating said stabilized platform relative to the aircraft about said at least one axis of rotation to control the boresight direction of said camera system during flight; and a data storage unit for storing said georegistered image data for subsequent use.

2. An imaging system as defined in claim 1 wherein said camera system comprises a plurality of CCD cameras, each having a different spectral response.

3. An imaging system as defined in claim 1 wherein said aircraft includes a cargo door and wherein said camera system, said IMU and said stabilized platform are mounted to said cargo door.

4. An imaging system as defined in claim 1 further comprising means responsive to a desired aircraft trajectory and said GPS data for indicating deviations of the aircraft from the desired aircraft trajectory.

5. An imaging system as defined in claim 1 wherein said GPS receiver comprises a differential GPS receiver.

6. An imaging system as defined in claim 1 wherein said GPS receiver comprises a kinematic GPS receiver.

7. An imaging system as defined in claim 1 wherein said control unit includes means for rotating said stabilized platform relative to the aircraft about pitch and roll axes to maintain the boresight direction of said camera system substantially vertical during flight.

8. An imaging system for use in an aircraft, said imaging system comprising:

a camera mounted in the aircraft for providing image data representative of a ground survey area, said camera having a boresight direction;

a global positioning system (GPS) receiver for providing GPS data representative of position of said camera;

an inertial measurement unit (IMU) for providing IMU data representative of attitude of said camera, said IMU having IMU-coordinate axes;

a processing unit comprising means for generating an IMU error model for use in determining attitude errors, means responsive to said IMU data and said IMU error model for providing attitude data that is corrected for said attitude errors, comprising a strapdown navigation routine that propates position, velocity and attitude of the IMU coordinate axes forward in time using measurements of change in angle, and a transfer alignment Kalman filter that merges the velocity measurement and an output of the strapdown navigation routine to produce an estimate of the attitude errors in the IMU attitude data, and means responsive to said GPS data, said attitude data and said image data for providing georegistered image data comprising corresponding sets of said image data, said GPS data and said attitude data, wherein each frame of said image data is registered by said GPS data and said attitude data to said ground survey area; and a data storage unit for storing said georegistered image data for subsequent use.

9. An imaging system as defined in claim 8 wherein said camera comprises a charge coupled device (CCD) camera.

10. An imaging system as defined in claim 8 wherein said camera comprises a plurality of CCD cameras, each having a different spectral characteristic, and wherein said image data represents images in different spectral ranges.

11. An imaging system as defined in claim 8 wherein said GPS receiver comprises a differential GPS receiver.

12. An imaging system as defined in claim 8 wherein said GPS receiver comprises a kinematic-capable GPS receiver.

13. An imaging system as defined in claim 8 further comprising a stabilized platform to which said camera and said IMU are rigidly mounted and a control unit responsive to said IMU data for rotating said stabilized platform relative to the aircraft about at least one axis of rotation to control the sensing direction of said camera as the aircraft moves.

14. An imaging system as defined in claim 13 wherein said control unit includes means for rotating said stabilized platform relative to the aircraft about pitch and roll axes to maintain the sensing direction of said camera substantially vertical during flight.

15. An imaging system as defined in claim 14 wherein said camera, said IMU and said stabilized platform are affixed to a door of the aircraft.

16. An imaging system as defined in claim 15 wherein said camera comprises a plurality of CCD cameras, each having a different spectral characteristic.

17. An imaging system as defined in claim 14 further comprising means responsive to a desired aircraft trajectory and said GPS data for indicating deviations of the aircraft from the desired aircraft trajectory.

* * * * *